(12) United States Patent
Naslund et al.

(10) Patent No.: US 8,621,570 B2
(45) Date of Patent: Dec. 31, 2013

(54) ACCESS THROUGH NON-3GPP ACCESS NETWORKS

(75) Inventors: Mats Naslund, Bromma (SE); Jari Arkko, Kauniainen, FL (US); Rolf Blom, Jarfalla (SE); Vesa Lehtovirta, Espoo, FL (US); Karl Norrman, Stockholm (SE); Stefan Rommer, Vastra Frolunda (SE); Bengt Sahlin, Espoo, FL (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 313 days.

(21) Appl. No.: 12/937,008

(22) PCT Filed: Nov. 5, 2008

(86) PCT No.: PCT/SE2008/051261
§ 371 (c)(1),
(2), (4) Date: Oct. 8, 2010

(87) PCT Pub. No.: WO2009/126083
PCT Pub. Date: Oct. 15, 2009

(65) Prior Publication Data
US 2011/0035787 A1      Feb. 10, 2011

Related U.S. Application Data

(60) Provisional application No. 61/044,242, filed on Apr. 11, 2008.

(51) Int. Cl.
| | | |
|---|---|---|
| G06F 15/177 | (2006.01) |
| G06F 7/04 | (2006.01) |
| G06F 15/16 | (2006.01) |
| G06F 17/30 | (2006.01) |
| G06F 9/00 | (2006.01) |
| G06F 12/00 | (2006.01) |
| H04L 29/06 | (2006.01) |
| G11C 7/00 | (2006.01) |

(52) U.S. Cl.
USPC ........ 726/3; 709/222; 726/4; 726/11; 726/15; 726/21

(58) Field of Classification Search
USPC ............................................... 726/3; 709/222
See application file for complete search history.

(56) References Cited

U.S. PATENT DOCUMENTS 6,996,628 B2 *  2/2006  Keane et al. ................... 709/238
7,028,333 B2 *  4/2006  Tuomenoksa et al. ............. 726/3
(Continued)

FOREIGN PATENT DOCUMENTS

EP    2007097 A1    12/2008
EP    2048910 A1    4/2009
(Continued)

OTHER PUBLICATIONS

European Telecommunications Standards Institute. ETSI TR 181 011, V2.0.0 (Jan. 2008). Telecommunications and Internet converged Services and Protocols for Advanced Networking (TISPN); Fixed Mobile Convergence; Requirements analysis. Jan. 2008.

(Continued)

*Primary Examiner* — Carolyn B Kosowski
(74) *Attorney, Agent, or Firm* — Coats and Bennett PLLC (57) ABSTRACT

When setting up communication from a user equipment UE (1), such as for providing IP access for the UE in order to allow it to use some service, information or an indication or at least one network properly relating to a first network, e.g. the current access network (3, 3'), is sent to the UE from a node (13) in a sue and network such as the home network (5) of the subscriber ask UE. The information or indication can be sent in a first stage of an authentication procedure being part of the setting up of a connection from the UE. In particular, the network property can indicate whether the access network (3, 3') is trusted or not.

19 Claims, 6 Drawing Sheets

(56) References Cited

U.S. PATENT DOCUMENTS

| | | | |
|---|---|---|---|
| 7,028,334 B2* | 4/2006 | Tuomenoksa | 726/3 |
| 7,131,141 B1* | 10/2006 | Blewett et al. | 726/12 |
| 7,325,140 B2* | 1/2008 | Carley | 713/182 |
| 7,382,881 B2* | 6/2008 | Uusitalo et al. | 380/262 |
| 7,496,950 B2* | 2/2009 | Carley | 726/3 |
| 7,721,106 B2* | 5/2010 | Zhang | 713/182 |
| 7,886,340 B2* | 2/2011 | Carley | 726/3 |
| 7,933,253 B2* | 4/2011 | Akram et al. | 370/338 |
| 7,979,901 B2* | 7/2011 | Dajiang | 726/15 |
| 8,019,346 B2* | 9/2011 | Sachs et al. | 455/439 |
| 8,045,540 B2* | 10/2011 | Bajko et al. | 370/352 |
| 8,094,817 B2* | 1/2012 | Blom et al. | 380/44 |
| 8,474,016 B2* | 6/2013 | Carley | 726/3 |
| 2002/0026503 A1* | 2/2002 | Bendinelli et al. | 709/220 |
| 2002/0053031 A1* | 5/2002 | Bendinelli et al. | 713/201 |
| 2003/0233583 A1* | 12/2003 | Carley | 713/201 |
| 2004/0047308 A1* | 3/2004 | Kavanagh et al. | 370/328 |
| 2004/0103311 A1* | 5/2004 | Barton et al. | 713/201 |
| 2005/0063544 A1* | 3/2005 | Uusitalo et al. | 380/277 |
| 2005/0154895 A1* | 7/2005 | Zhang | 713/182 |
| 2005/0249219 A1* | 11/2005 | Bajko et al. | 370/395.3 |
| 2007/0006295 A1* | 1/2007 | Haverinen et al. | 726/14 |
| 2007/0121596 A1* | 5/2007 | Kurapati et al. | 370/356 |
| 2007/0157305 A1* | 7/2007 | Dajiang | 726/14 |
| 2007/0230707 A1* | 10/2007 | Blom et al. | 380/277 |
| 2008/0026724 A1* | 1/2008 | Zhang | 455/411 |
| 2008/0072291 A1* | 3/2008 | Carley | 726/3 |
| 2008/0095362 A1* | 4/2008 | Blom et al. | 380/45 |
| 2009/0150977 A1* | 6/2009 | Carley | 726/3 |
| 2009/0199290 A1* | 8/2009 | McCullough et al. | 726/12 |
| 2010/0075692 A1* | 3/2010 | Busschbach et al. | 455/452.2 |
| 2010/0150006 A1* | 6/2010 | Pourzandi et al. | 370/252 |
| 2010/0199332 A1* | 8/2010 | Bachmann et al. | 726/4 |
| 2010/0238874 A1* | 9/2010 | Haddad et al. | 370/329 |
| 2010/0281148 A1* | 11/2010 | Turanyi et al. | 709/222 |
| 2011/0004758 A1* | 1/2011 | Walker et al. | 713/168 |
| 2011/0009094 A1* | 1/2011 | Lehtovirta | 455/411 |
| 2011/0016309 A1* | 1/2011 | Motoyama et al. | 713/153 |
| 2011/0035787 A1* | 2/2011 | Naslund et al. | 726/3 |
| 2011/0040855 A1* | 2/2011 | Miklos et al. | 709/220 |
| 2011/0199987 A1* | 8/2011 | Rommer et al. | 370/329 |
| 2011/0202970 A1* | 8/2011 | Kato et al. | 726/1 |
| 2011/0264913 A1* | 10/2011 | Nikander et al. | 713/168 |
| 2011/0296489 A1* | 12/2011 | Alonso et al. | 726/1 |
| 2011/0317560 A1* | 12/2011 | Aramoto et al. | 370/235 |
| 2012/0026979 A1* | 2/2012 | Rommer et al. | 370/331 |
| 2012/0269167 A1* | 10/2012 | Velev et al. | 370/331 |

FOREIGN PATENT DOCUMENTS

| | | |
|---|---|---|
| WO | 2006/124840 A1 | 11/2006 |
| WO | 2008/001338 A2 | 1/2008 |
| WO | 2008155066 A2 | 12/2008 |

OTHER PUBLICATIONS

3rd Generation Partnership Project. 3GPP TS 24.234, V7.5.0 (Mar. 2007). 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 7). Mar. 2007.

3rd Generation Partnership Project. 3GPP TS 33.xyz, V.1.0.0 (Mar. 2008). 3rd Generation Partnership Project; Technical Specification Group Services and System Aspects; 3GPP System Architecture Evolution: Security aspects of non-3GPP accesses; (Release 8). Mar. 2008.

3rd Generation Partnership Project, Technical Specification Group Service and System Aspects, "3G Security; Wireless Local Area Network (WLAN) interworking security", Mar. 2008, Release 8, 3GPP TS 33.234 V8.1.0.

3rd Generation Partnership Project, Technical Specification Group Services and System Aspects, "Architecture enhancements for non-3GPP accesses", Release 8, Dec. 2007, 3GPP TS 23.402, V8.0.0.

Arkko, J. et al., "Extensible Authentication Protocol Method for 3rd Generation Authentication and Key Agreement (EAP-AKA)", Network Working Group, Jan. 2006, The Internet Society.

Perkins, C. et al., "Authentication, Authorization, and Accounting (AAA) Registration Keys for Mobile IPv4", Network Working Group, Mar. 2005, The Internet Society.

Nokia Siemens Networks et al., "Clarification on terms of Trusted and Untrusted non-3GPP networks," 3GPP Draft, S2-082932, Change Request, Apr. 7-11, 2008, 3GPP TSG-SA2 Meeting #64, Jeju, Korea.

Samsung, "On supporting trusted/untrusted access," 3GPP Draft, S2-083477, TD S2-083477, 3GPP TSG SA WG2 Meeting #64b adhoc, May 7-9, 2008, Munich, Germany, and #65, May 12-16, 2008, Prague, Czech Republic.

Samsung, "Principles of decisions on trusted/untrusted", 3GPP Draft, TD S2-083809, Change Request, 3GPP TSG SA WG2 Meeting #64b adhoc, May 7-9, 2008, Munich, Germany and #65, May 12-16, 2008, Prague, Czech Republic.

* cited by examiner

ACCESS THROUGH NON-3GPP ACCESS NETWORKS

TECHNICAL FIELD

The present invention relates to a method of setting up communication between a UE (User Equipment), also called a terminal, user terminal or user station, and a network node and it further relates to a system comprising at least a UE and a network node.

BACKGROUND

The 3GPP (3:rd Generation Partnership Project) is in the process of defining an extended standard for data packet forwarding called EPS (Evolved Packet System). In the EPS, besides the native 3GPP-access technologies such as WCDMA (Wideband Code Division Multiple Access, LTE (Long Term Evolution), there will also be support for access to data communication services and/or Internet services via a non-3GPP access, including in particular access through a home network such as an HPLMN (Home Public Land Mobile Network) via non-3GPP access methods/technologies/networks/standards, e.g. WiMAX according to the standard IEEE 802.16, a WLAN (Wireless Local Area Network), e.g. according to the standard IEEE 802.11g/n, xDSL (Digital Subscriber Line), etc. For the purpose of the discussion herein, "home network" should be understood as the entity with which an end user has a business agreement, often in form of a subscription, for network access or service access and thus comprises both conventional telecom operator networks, as well as virtual operators, etc. The access network may be operated and/or administrated by another entity than the home network in which case a business agreement between the two networks usually exists.

The non-3GPP access methods can be fitted into one of two categories:
Trusted non-3GPP access, and
Non-trusted non-3GPP access, also called entrusted non-3GPP access.

Figure 1A:
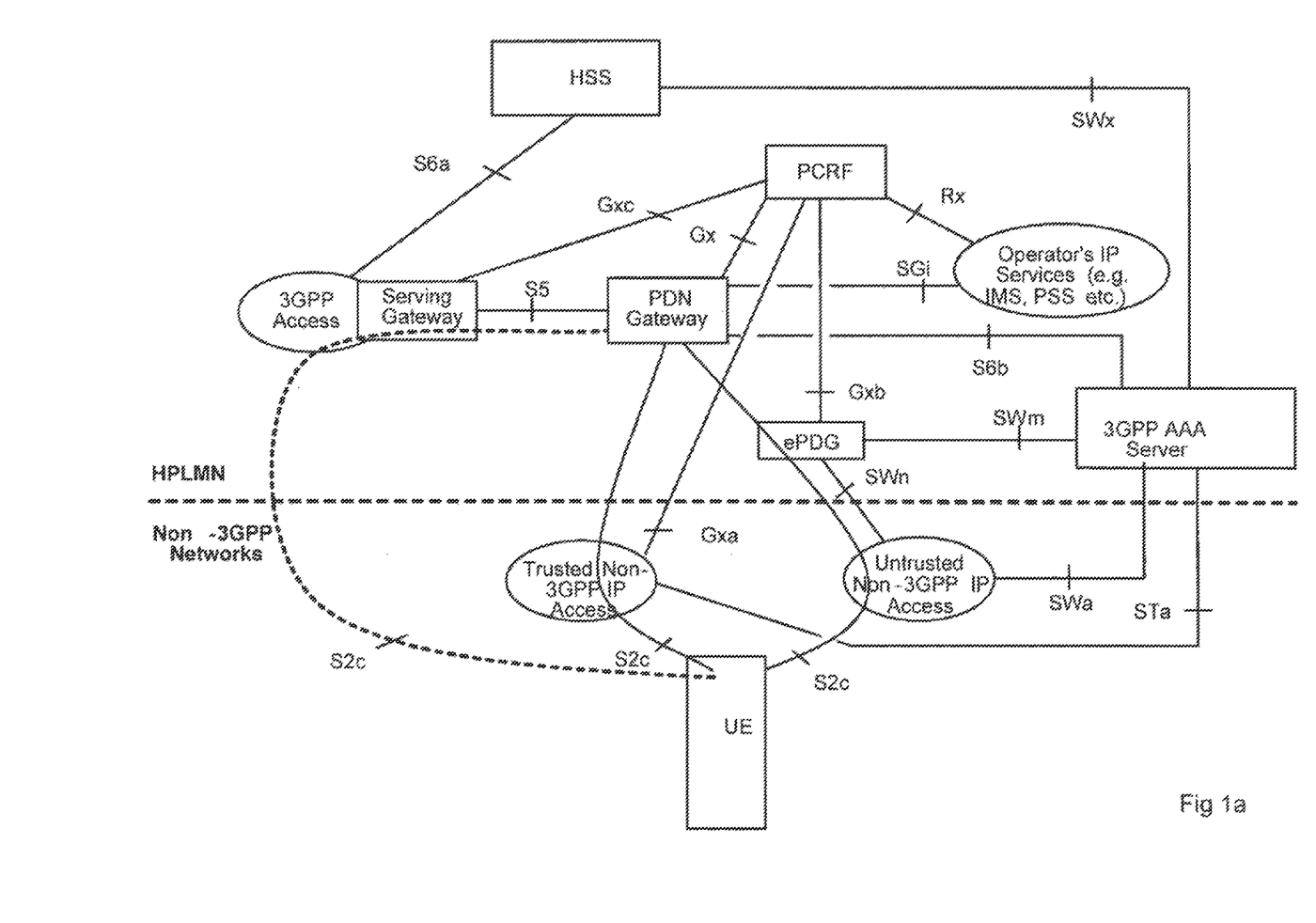
FIG. 1a is a schematic view of an EPS according to prior art.

The two categories of non-3GPP access are illustrated in FIG. 1a which is an overview of an "evolved packet system" as defined in the standard document 3GPP TS23.402, "Architecture enhancement for non-3GPP accesses".

The exact definition of the terms "trusted" and "non-trusted" for an EPS access is being currently discussed. The discussion is complicated due to the fact that both technical aspects apply—consider e.g. the question: Is the access secure/trusted due to sufficient technical protection means?—as well as business aspects—consider e.g. the question: Has the home operator, i.e. the operator of the home network, a sufficiently strong "agreement" with the operator of the access network, thereby making, as seen from the home operator, the access network trusted? There are thus both subscriber interest (e.g. privacy) as well as operator interest (e.g. business) to ascertain whether a certain access is trusted or not.

What is clear is that Trusted and Untrusted Non-3GPP Access Networks generally are IP (Internet Protocol) access networks that use access technology, the specification of which is outside the scope of 3GPP. An "assumption" recently taken by the 3GPP SA2 for working purposes in this respect is that whether a Non-3GPP IP Access Network is trusted or untrusted is not a characteristic of the access network itself. In a non-roaming scenario it is the decision of the operator of the HPLMN. i.e. the home operator, if a specific Non-3GPP IP Access Network is used as a Trusted or an Untrusted Non-3GPP Access Network and it is up to the operator to implement appropriate security measures in the respective case, e.g. according to the discussion below in the background description.

It is obvious that the different types of non-3GPP accesses will use different protection means between the home network and the terminal/UE, for example:

In establishing connectivity in a non-trusted access an IPsec (Internet Protocol Security) tunnel between the terminal and a "gateway" node "above" the access. i.e. an ePDG (evolved Packet Data Gateway), as illustrated in FIG. 1a, will probably be set up. "Connectivity is herein taken to mean "the state or a state of being connected". The setting-up of the IPsec tunnel is furthermore made by a procedure executed according to the IKE (Internet Key Exchange) protocol, specifically version 2 thereof. This will make the security more or less independent of the security features of the access network used. A trusted access will however not have or need this feature.

In establishing connectivity in a trusted access the EAP (Extensible Authentication Protocol) is likely to be used and it can include, but not necessarily, the EAP AKA (Authentication and Key Agreement) method for the access authentication, whereas a non-trusted access may use or may not use the EAP.

Accesses established according to different methods may use different mobility solutions, e.g. client MIP (Mobile IP) or PMIP (Proxy MIP).

Consider a UE that is about to establish connectivity, e.g. for the purpose of attaching to some service or services through a Non-3GPP Access Network. A priori, the UE does in general not know whether the access is considered "trusted" or not by the home network. The question is then whether the UE should set up an IPsec tunnel to an ePDG or not, this being a procedure requiring relatively large resources/costs/time that should be avoided if possible. In particular, if the UE attempts to use the IKE/IPsec, but it is not actually supported by the network, signaling is wasted and/or error-cases will occur.

While the UE could be statically preconfigured with suitable information, there are no generally used methods of dynamically signalling to the UE whether the access is considered trusted or not. In general, the UE can deduce some "technical" aspects from the very technology used, e.g. WIMAX or WLAN, but the UE cannot get information and understand all technical aspects, for example the presence of an ePDG or which mobility protocol that is to be used. On a higher level, the UE cannot know about the "business" driven aspects. For instance, consider a given non-3GPP access network, e.g. a WiMAX network provided by a party or operator A. Two different home network operators. B and C, could have different opinions on whether the party A and the network provided thereby is trusted or not due to their security policies and business arrangements. Thus, a UE using a subscription at the operator B should perhaps consider the party A and its access network trusted, whereas a UE using a subscription at the other operator C should consider the party A and its access network non-trusted. The situation is made even more complicated if "legacy" accesses through 3GPP networks, e.g. an I-WLAN (Interworking Wireless Local Area Network) according to the standard document 3GPP TS 33.234, are considered. In an access through an I-WLAN access network a gateway in the form of a PDG (Packet Data Gateway, a gateway according to the general or older 3GPP standard to be distinguished from the special ePDG mentioned above) can be used to terminate the IPsec tunnel to/from the UE and thus this WLAN network will be considered "non-trusted". However, access through a WLAN connected to an EPS could, in the future, perhaps be trusted, e.g. due to the use of security enhancements according to the standard IEEE 802.11i, and would thus not use or have the IPsec/PDG. This shows (again) that a given access technology may or may not be considered trusted and use different security means towards the UE depending on the situation.

In summary, there may be a need for a way to notify the UE on at least some "property" of the access network, such a property involving whether the access is trusted or not, which type of mobility and security functions should be used, etc. Moreover, a method for making such a notification should be sufficiently secure in order to avoid attacks and it should of course also provide robustness in general.

SUMMARY

It is an object of the invention to allow a UE to establish connectivity to or through a network in a way that at least in one or more aspects is efficient and/or secure.

Such aspects may e.g. include bandwidth/signaling/computational overhead and strength against malicious attacks.

Hence, the UE may e.g. be allowed to choose a way of communication dependent on properties of a network through which it shall be connected.

Generally, when establishing connectivity from a UE, such as for providing IP connectivity for the UE in order to allow it to use some service, at least one network property relating to a first network is sent to a UE from a node in a second network. The first network can include an access network and the second network can be e.g. the same as the first network or it may be the home network of the UE/subscriber. Thus, in the second case, the node resides in or can be connected in/to the home network. The network property is used by the UE to select an appropriate way of accessing the first network. The first network may as already mentioned be an access network. e.g. a WLAN, comprising the WLAN radio access part and the fixed-line connection to the access point, and possibly also a core network or selected parts thereof behind an access network.

Information about or an indication of the network property may be sent in or inside messages forwarded to the UE in a preliminary stage of setting up the communication, in particular inside a message sent in an authentication procedure, e.g. in a first stage thereof. Hence, it may be possible for the UE to become aware of at least one necessary "property" of the access in a secure way, without adding new signalling roundtrips or protocols.

In particular, the network property may indicate to the UE whether the first network to which the network property relates is trusted or not. The property may also or alternatively be related to which specific protocols the UE should use and in particular, which mobility and/or security protocols to use.

The first network to which the network property relates may e.g. be an access network as mentioned above. The node in the second network may comprise an AAA (Authentication, Authorization, Accounting) server. Then, the network property may indicate whether the access network is trusted or not and it can be sent within an EAP message from the AAA server. The property may in particular be sent inside an EAP Request/AKA challenge message, inside an EAP Request/AKA-Notification message or inside an EAP Success message.

The node in the second network may alternatively comprise an HSS (Home Subscriber Server).

A representation of the access method as described herein may in the common way comprise one or more computer programs or computer routines, i.e. generally parts of program code which is readable by a computer, herein also called a processor or an electronic processor, in order to perform corresponding procedural steps. The parts of program code can have been written to and can be or have been read from one or more computer program products, i.e. program code carriers, such as a hard disc, a compact disc (CD), a memory card or a floppy disc. The parts of program code may e.g. stored in a memory of a UE and/or of a network node or server, such a memory being e.g. a flash memory, an EEPROM (Electrically Erasable Programmable ROM), a hard disc or an ROM (Read-Only Memory).

BRIEF DESCRIPTION OF THE DRAWINGS

The objects, advantages and effects as well as features of the invention will be more readily understood from the following detailed description of exemplary embodiments of the invention when read together with the accompanying drawings, in which.

DETAILED DESCRIPTION

While the invention covers various modifications and alternative constructions, embodiments of the invention are shown in the drawings and will hereinafter be described in detail. However it is to be understood that the specific description and drawings are not intended to limit the invention to the specific forms disclosed. On the contrary, it is intended that the scope of the invention includes all modifications and alternative constructions thereof falling within the spirit and scope of the invention.

Figure 1B:
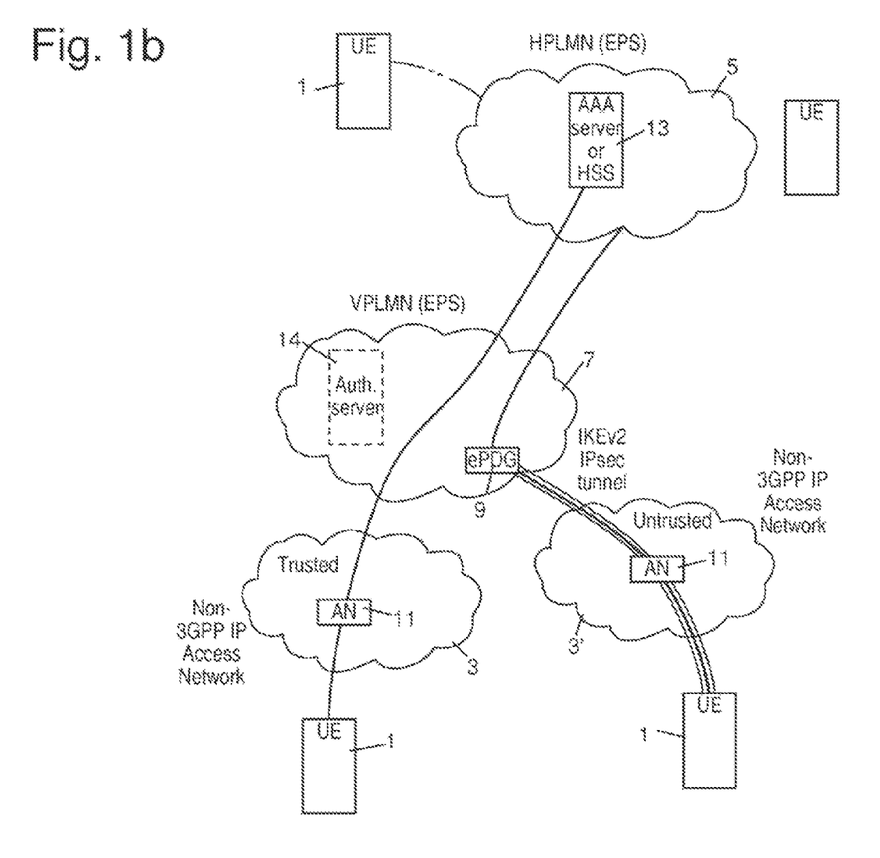
FIG. 1b is another schematic view of an EPS including a VPLMN (Visited Public Land Mobile Network).

A procedure involving a UE that will access a home network will now be described. In particular, it will described how a UE establishes network connectivity. The purpose may e.g. be that a UE desires a connection through a home network, to a party such as a client or server, not shown, connected to the home network or to a service accessible through the home network. However, the procedure as described herein only addresses the establishment of network connectivity and how or for what purpose the connectivity is to be used is not part of the procedure. In FIG. 1b the most important components involved are schematically illustrated. A UE 1, generally a terminal, e.g. a mobile telephone or mobile station, will set up the connection through a Non-3GPP Access Network that is, as regarded by a home network HPLMN 5, either a trusted network such as that illustrated at 3 or a non-trusted network such as that illustrated at 3'. Furthermore, in the illustrated case the UE 1 is also roaming, i.e. it will through the respective access network access its HPLMN through a VPLMN 7. Both the HPLMN and the VPLMN are here assumed to work according to the EPS standard. Also, the UE 1 is assumed to have facilities for working according to the same standard.

The UE 1, associated with the home network 5, that is establishing connectivity using the standard EPS via a Non-3GPP Access Network can be assumed to have a USIM (Universal Subscriber identity Module), not shown. Even if the USIM is not needed for access authentication, it is typically needed for setting up a secure IPsec connection to an ePDG 9 in the VPLMN 7 and/or for setting up secure mobility signaling, e.g. MIP.

The UE 1 initiates the connectivity establishment by starting a set-up procedure. It first sends a request signal or message, requesting a connectivity to a non-3GPP access network 3, 3', see also the signal diagram of FIG. 3 where steps of the set-up procedure for the access are illustrated. The request may contain basic/physical access specific identifier(s) for the UE 1. e.g. MAC (Media Access Control) address etc. An access node (AN) 11 in the respective access network receives the request signal or message, analyzes it and responds by e.g. starting a UE Identity exchange procedure, this being e.g. the first stage of an authentication procedure according to e.g. the EAP. This identity is typically a logical identity which may include information about the home network of the UE 1 and is usually not tied to a specific access technology. In such a UE Identity exchange procedure, the AN 11 in the respective access network 3, 3' first sends an EAP Request Identity message to the UE 1, see the more detailed signal diagram of FIG. 2. The UE 1 receives the EAP Request Identity message and sends in response thereto an EAP Response Identity message that contains information about the UE identity and is received by the AN 11 in the respective access network. The AN identifies the message as an EAP Response Identity message and forwards it to a respective server 13 in the HPLMN 5 for or associated with the UE 1, the forwarding taking place through the VPLMN 7 for the case illustrated in FIG. 1b. While the authentication/EAP signaling between the UE 1 and the AN 11 is carried over an access specific protocol, e.g. 802.1x, the authentication/EAP forwarding to the server 13 is typically carried over an IP based AAA protocol such as Diameter or Radius. The AN 11 may thus add additional information elements when forwarding the EAP message over the AAA protocol, e.g. an identifier of the access network 3, 3' and/or the AN 11. From this EAP Response Identity message, when received by the server in the HPLMN, the server can derive or deduce the identity of the access network 3, 3' through which the message was forwarded, e.g. via network identifiers carried in the AAA protocol. The server 13 in the HPLMN 5 can be an AAA server or an HSS.

Figure 2:
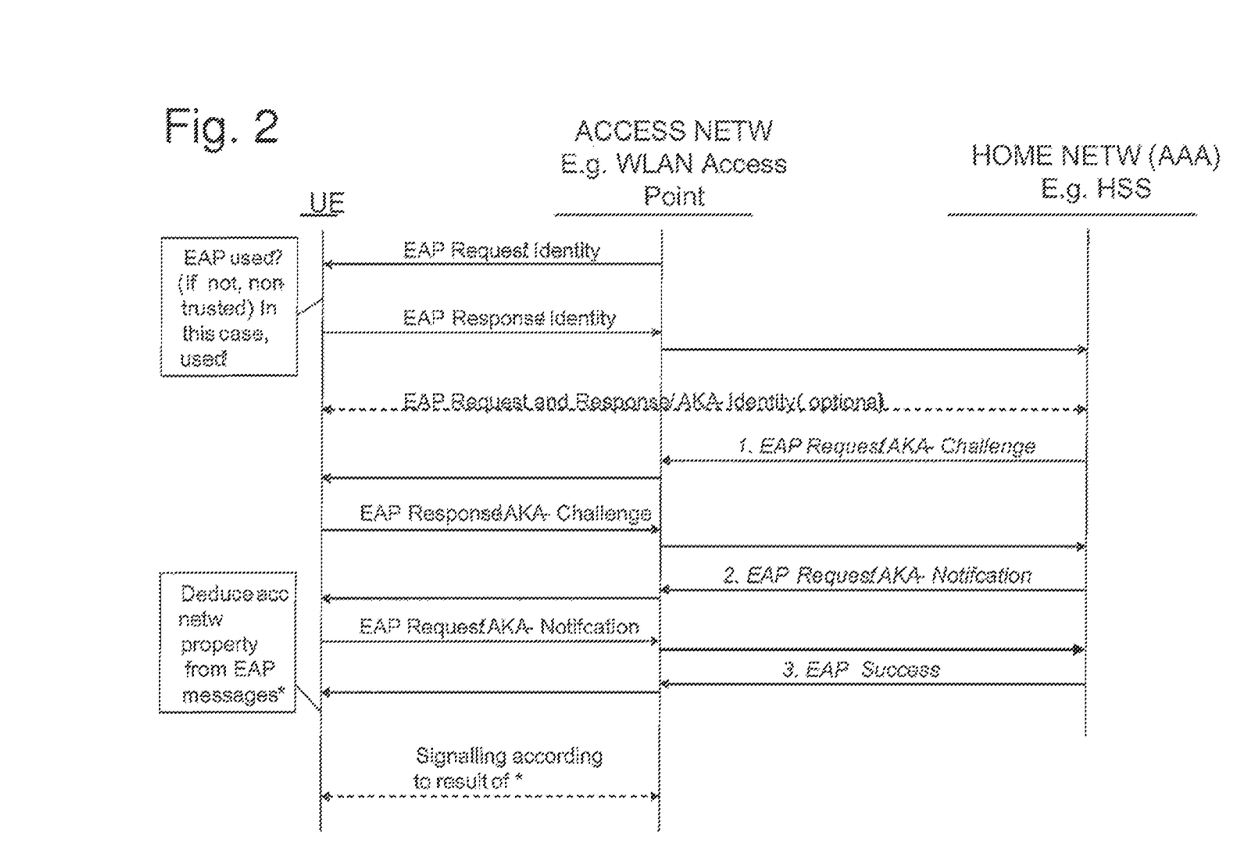
FIG. 2 is a diagram of signals transmitted between nodes involved in an authentication procedure according to the EAP.

Now the very authentication procedure starts, and it can also be performed e.g. according to the EAP. In the authentication procedure appropriate messages are sent between the server 13, and the UE 1, these messages being forwarded substantially unchanged through the respective access network 3, 3' passing the AN 11 and the VPLMN 7. Thus, except performing conversion between the AAA protocol and the access specific signaling protocol, the AN 11 typically only relays all these messages between the UE and the server.

As seen in FIG. 2, these messages associated with the authentication procedure can include, sequentially in time, an EAP Request AKA Challenge message sent from the server, an EAP Response AKA Challenge message sent from the UE, an EAP Request AKA Notification message sent from the server, an EAP Request AKA Notification message sent from the UE and an EAP Success message sent from the server, assuming the authentication to be successful.

At this point, the UE may be assigned a local IP address by the access network. However, the UE may still not be reachable and may need to take further steps to establish connectivity to other parties. Specifically, the UE may need to establish connectivity to a gateway node, e.g. the aforementioned ePDG 9 used in untrusted accesses. The node in question could additionally/alternatively be a node providing mobility support, e.g. a MIP Home Agent (HA). This provides the necessary security and/or "global" reachability for the UE.

Thus, after a successfully completed authentication procedure a fourth procedure can be performed, including steps specific to the access network and the establishment of a general IP connection for the UE 1. This completes the connectivity establishment. The UE will henceforth be able to receive/send data, e.g. initiate communication sessions with other parties. The communication of data between the UE and some other party thus may take place in a fifth procedure that is outside the procedure as described herein.

One of the messages sent from the server 13 in the authentication procedure can be modified to contain special information or to indicate a special condition. The special information or special condition can relate to a property or characteristic of the access network 3, 3' used. In particular it can indicate whether the access network is trusted or untrusted, as seen from the HPLMN 5.

The UE 1 is adapted to retrieve the special information from or to interpret the special condition indicated in the message and to use it or the interpretation thereof, respectively, in the set-up of a connection through the respective access network 3, 3'.

In order to perform the procedure described above, the server 13 is modified so that it can collect and insert the special information in a chosen message or modify the chosen message making it indicate the special condition, fetching pertaining information from e.g. a list or database in or connected to the server. The list or database may e.g. at least include all trusted access networks. The list or database may of course also include untrusted networks if required. The look-up in this list or database may be based on the access network identifier received as part of the procedure performed according to the AAA protocol as discussed above. The list or database can be continuously updated. Due to e.g. a new business agreement, a previously untrusted network may be "upgraded" to become trusted and vice versa.

Hence generally, whenever the EAP (AKA) is used in the access procedure, an indication from e.g. the server 13 in the form of an AAA server in the home network 5 to the UE 1 about the "properties" of the respective access network 3, 3', can be included in the EAP signalling. A useful feature of the EAP (AKA) is that it can be end-to-end (e2e) secure between the server and the UE, thus protecting the included network property/properties against e.g. forgery by $3^{rd}$ parties. However, the indication could also be included in the signalling of other authentication protocols when the EAP (AKA) is not used.

Figure 4A:
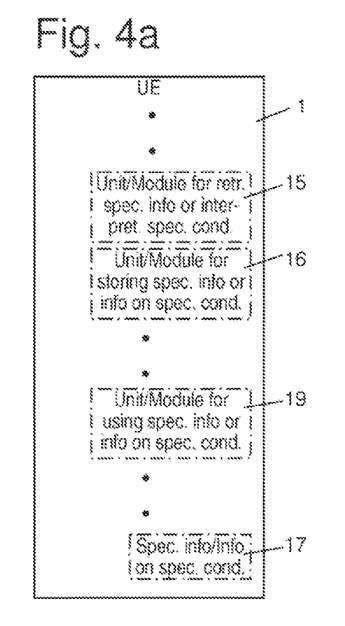
FIG. 4a is a block diagram of a user equipment illustrating units or modules required for retrieving or interpreting special information in a received message and for using the special information.

In order to be capable of performing these tasks, the UE 1 must be modified to include functions performed by units or modules as illustrated in FIG. 4a. Hence, a unit or module 15 for retrieving special information from one or more messages or for interpreting a special condition indicated in one or more messages must be provided. There could be a unit or module 16 for storing the special information or information about the special condition, respectively, in a memory cell 17 in the UE 1. Finally, the UE can include a unit or module 19 for using the received and/or stored special information or the information about the special condition, respectively, such as for selecting an appropriate or suitable way of setting up a connection through an access network. Each of these units or modules can as conventional be considered to comprise a processor and a corresponding segment or corresponding segments of program code.

Figure 4B:
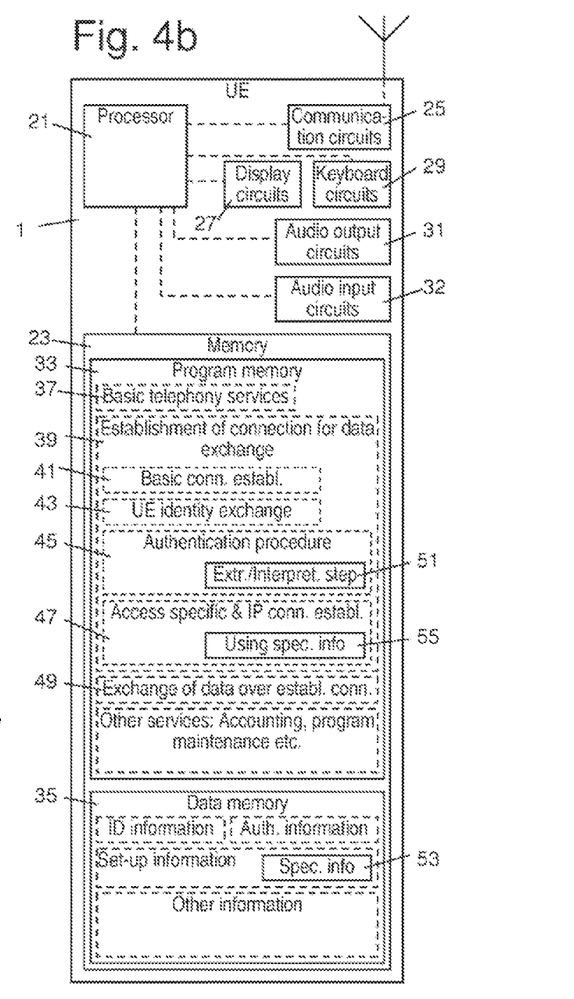
FIG. 4b is a block diagram of user equipment illustrating typical internal components thereof.

Generally, the UE 1 can have a substantially conventional structure and include internal components organized e.g. as schematically illustrated in the block diagram of FIG. 4b. It may thus include a processor 21, a memory 23, radio communication circuits 25, circuits 27 for driving the display, not shown, circuits 29 for the keyboard, not shown, audio output circuits 31 and audio input circuits 32. The memory 23 may be an electronic memory such as a flash memory, an EEPROM (Electrically Erasable Programmable Read-only memory), a hard disc or an ROM (Read-Only-Memory) and it may comprise one or more separate physical units. The processor controls the operation of the UE 1 by executing program code stored in the program memory part 33 of the memory. The processor 21 can use data stored e.g. in the data memory part 35 of the memory 23.

Figure 3:
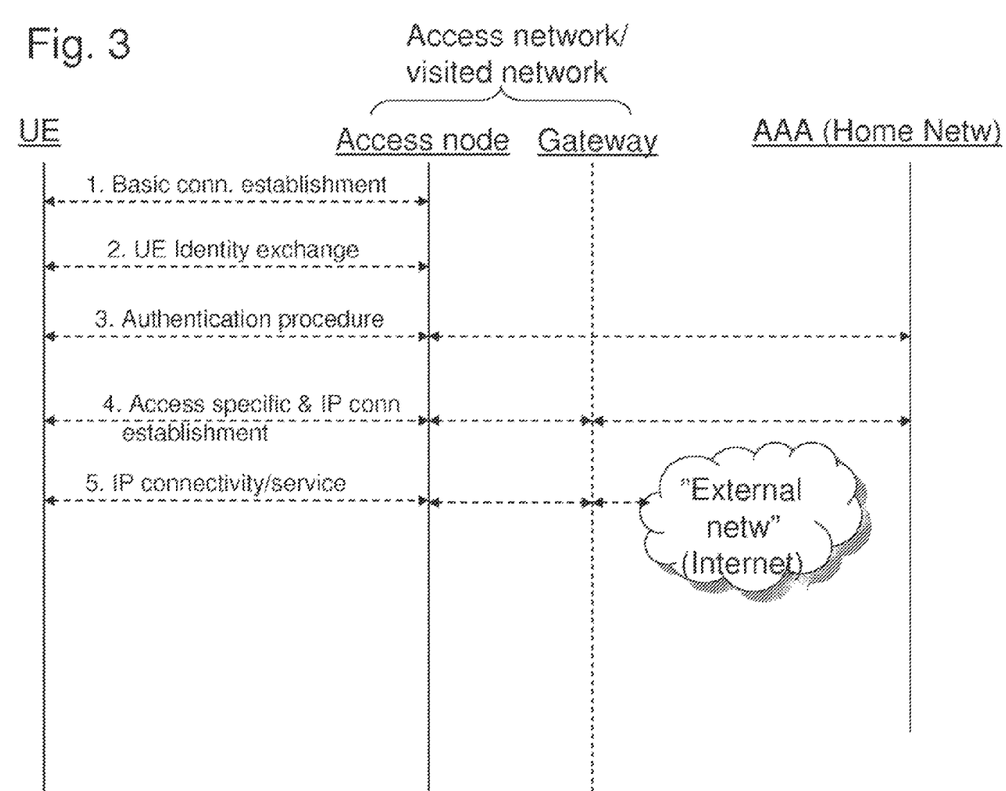
FIG. 3 is a diagram of signals transmitted between nodes involved in an access procedure for user equipment.

In the program memory 33 program code having different routines or parts for the various procedures executed by the processor 21 is stored. Thus, the part of program code for the basic telephony services is stored in a memory segment 37, such services including establishing and using audio connections to other UEs. There is also program code stored in a memory segment 39 for procedures involving the exchange of data, such as for setting up an IP connection. This program memory segment may thus include memory portions in which the program code parts for the procedures illustrated in FIGS. 2 and 3 are stored. These memory portions thus comprise program code that can be read by the processor 21 and, when read by the processor, makes the UE carry out the corresponding procedures. There may be a memory portion 41 for storing program code for a basic connection establishment, a memory portion 43 for storing program code for exchange of UE identity, a memory portion 45 for storing program code for an authentication procedure, and a memory portion 47 for storing program code for access specific and IP connection establishment. In the program memory 33 there may further be a memory segment 49 for storing program code for IP connectivity/service, e.g. program code parts for handling IP mobility (MIP), multihorning, IP security (IKE/IPsec), etc.

In the memory portion 45 for storing the program code for an authentication procedure there may be provided memory space 51 for storing program code for retrieving special information from or for interpreting a special condition indicated in a message received in the authentication procedure. Such special information or condition can as mentioned above e.g. be related to at least one network property associated with establishing connectivity for a connection for data exchange, such as a property of an access network 3, 3' used. The special information or information about the special condition can be stored in a memory cell 53 in the memory 23 and it can be used e.g. in procedure of access specific and IP connection establishment for which the program code is stored in the program memory portion 49. The program code part for this use can be stored in a memory space 55 inside said memory portion.

Figure 4C:
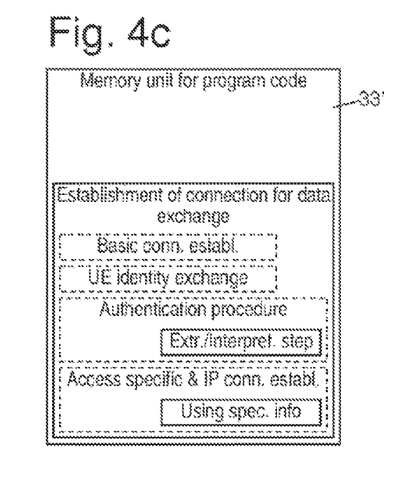
FIG. 4c is a schematic of a memory unit holding or carrying program code for use by a user equipment.

The parts of program code can have been written to and can be or have been read from one or more computer program products, i.e. program code carriers, such as a hard disc, a compact disc (CD), a memory card or a floppy disc. Such a computer program product is generally a memory unit 33' that can be portable or stationary and is illustrated in the schematic of FIG. 4c. It can have memory segments, memory cells and memory spaces arranged substantially as in the program memory 33 of the UE 1 or the program code can e.g. be compressed in a suitable way. Generally, the memory unit 33' thus comprises computer readable code, i.e. code that can be read by an electronic processor, which when run by a UE 1 causes the UE to carry out steps for executing one or more of the procedures that the UE performs according to the description above. The program code carried by the memory unit 33' can be entered into the memory 23 of the UE by any suitable method such as by downloading from a server, not shown, holding or connected to the memory unit. In other embodiment, the memory unit 33' can be used directly as part of the memory 33 of the UE 1.

Figures 5A, 5B, 5C, 5D:
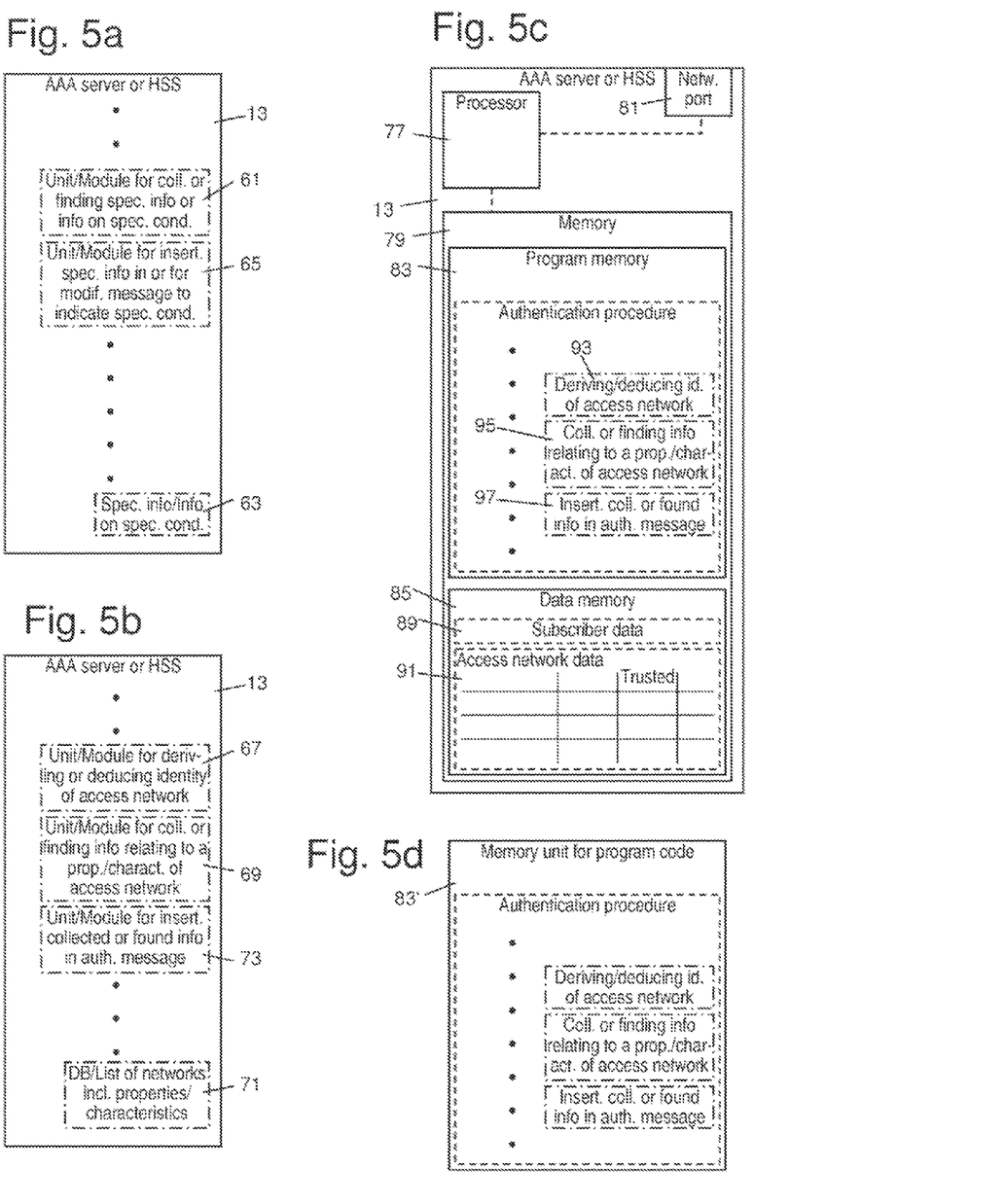
FIG. 5a is a block diagram similar to FIG. 4a of a node or server illustrating units required for retrieving and inserting special information in a message.
FIG. 5b is a block diagram similar to FIG. 5a where the message is a message included in an authentication procedure.
FIG. 5c is a block diagram similar to FIG. 4b of a node or server illustrating typical internal components thereof.
FIG. 5d is a schematic of a memory unit holding or carrying program code for use by a server.

In the same way as for the UE 1, in order to be capable of performing the procedure described above, the server 13 must be modified to include, as illustrated in FIG. 5a, a unit or module 61 for collecting or finding special information or information relating to a special condition. This unit or module can e.g. fetch such information from a memory cell 63 in or connected to the server 13. Another unit or module 65 can insert the special information in one or more chosen messages or modify one or more messages to indicate the special condition.

As seen in FIG. 5b, the server 13 can, for the example described above, be modified to include a unit or module 67 for deriving or deducing which access network is used by a subscriber for which there is some ongoing communication between the subscriber's UE 1 and the server. The server then also includes a unit or module 69 for collecting or finding information relating to a property or characteristic of the access network used. This unit or module can retrieve such information from a database or list or networks, the data base or list including e.g. special information for a number of networks and being stored in a memory place 71. Another unit/or module 73 can insert information relating to a property or characteristic in a message sent to a subscribed during an authentication procedure.

The server 13 can be implemented as a computer, a cluster of computers or a portion of a computer suited for connection to a network. Thus, as seen, in FIG. 5c it can comprise in the conventional way a processor 77, a memory 79 and a network port 81. The memory 79 may be an electronic memory such as a flash memory, an EEPROM, an EPROM (Erasable Programmable Read-only memory), a hard disc or an ROM. The memory can have spaces 83, 85 for program code and data, respectively. In the program memory a program code part is stored in a memory segment 87 for performing an authentication procedure, e.g. according to the EAP as described above. In the data memory space 85 subscriber data are stored in a memory place 89 and data about access networks are stored in a memory place 91. The data about access networks can comprise a record for each access network and in each record there may in particular be a field, in which information is stored indicating whether the access is trusted or untrusted. In the memory segment 87 in which the program code part for the authentication procedure is stored, there are memory portions 93, 95, 97 in which program code parts are stored for deriving or deducing the identity of the access network used, for collecting or finding information relating to a special property or characteristic of the access network and for inserting the collected or found information in authentication message, i.e. in one of the messages sent to the subscriber's UE during the authentication procedure, respectively.

The parts of program code can have been written to and can be or have been read from one or more computer program products, i.e. program code carriers, such as a hard disc, a compact disc (CD), a memory card or a floppy disc. Such a computer program product is generally a memory unit 83' that can be portable or stationary as illustrated in the schematic of FIG. 5*d*. It can have memory segments, memory cells and memory spaces arranged substantially as in the program memory 83 of the server 13. The program code can e.g. be compressed in a suitable way. Generally, the memory unit 83' thus comprises computer readable code, i.e. code that can be read by an electronic processor such as 77, which when run by a server 13 causes the server to carry out steps for executing one or more of the procedures or procedural steps that the server performs according to the description above. The program code carried by the memory unit 83' can be entered into the memory 23 of the UE by any suitable method such as by downloading from a server, not shown, comprising or connected to the memory unit. If suitable, the memory unit 83' can be used directly as part of the memory 83 of the server 13.

It was above said that e.g. the EAP is used in the set-up of the connection. As mentioned, in the case of an untrusted access, this cannot be taken for granted and thus a general case also needs to be handled. The following more general procedure can be used for an access in a system which includes a 3GPP home network 5 and a Non-3GPP Access Network 3, 3' and in which the EAP may or may not be used:
1. The UE 1 requests access.
2. A basic identity exchange takes place.
3. If the respective access network 3, 3' does not initiate access authentication according to the EAP, the UE 1 can in most cases assume that the access network is non-trusted. A tunnel to an ePDG 9 will be needed, e.g. created using a procedure performed according to the IPSec. A timer may, if desired, be provided to check whether an EAP access authentication procedure has been initiated within a predetermined time. In another alternative it is determined by the UE that there will be no initiation of EAP communication if an IP address for connection is provided to the UE 1 from the respective access network 3, 3' such as via e.g. a DHCP (Dynamic Host Configuration Protocol) server, not shown. Specifically, if EAP authentication would be used, it would have taken place prior to IP address assignment.
4. Else, if the respective access network 3, 3' does initiate EAP access authentication, the access network could be either trusted or non-trusted.
5. For the case of step 2, the home AAA server 13, knowing whether the access is trusted or not, includes a parameter in some EAP message informing the UE 1 about this. This parameter can as mentioned above be e2e secure, i.e. encrypted and/or integrity protected, between the home AAA server and the UE.
6. The UE 1 verifies authenticity of the indication and acts accordingly, e.g. attempts or does not attempt to set up an IPsec tunnel to an ePDG 9, etc. In the case where it does not attempt to set up an IPsec tunnel it will instead try to e.g. set up plain unprotected IP communication channel.
7. Other procedures being part of the connectivity establishment are carried out, e.g. configuration of IP mobility, etc., which may also be dependent on the above indication.
8. The UE can now communicate and/or use other services.

The messages Nos. 1, 2 and 3, the titles of which are drawn in italics in FIG. 2, may, as mentioned above, be used for the special information or indication, e.g. carrying an "access property attribute" or "access property attributes". For instance, the AKA-Challenge message may contain (protected) EAP pseudonyms, and could be extended to include further attributes, in this case pertaining to the access network properties. It should be observed that the messages No. 1 and No. 2 are AKA-method specific messages, whereas the AKA success message No. 3 is not an AKA-method specific message. Presently, a new version of EAP AKA, denoted EAP AKA', is being defined in the IETF (Internet Engineering Task Force). The specific messages discussed above as suitable to carry the property exist also in EAP AKA' and can therefore be used in a similar manner.

Thus, the "algorithm" performed in the UE 1 to determine access network trust (or other properties) would be performed according to the following general logic code:

```
If access network does not use EAP then
    "access is untrusted"/* e.g. need to set up IPSec tunnel */
else
    run EAP (as described above)
    extract trust value and possibly other network properties from the
    EAP signaling run (security/mobility/. . .) procedure(s) according to
    extracted trust value and possibly other/network properties
endif
```

However, there is one problem associated with this algorithm. The UE 1 will before any possible execution of the EAP, perform some basic "network attach", i.e. perform some first operation signaling that it wants to connect to the respective access network. How long after this attach should the UE "wait" for the EAP? The UE 1 could for instance assume that after waiting 2 seconds an authentication procedure according to the EAP will not be performed, but perhaps it would have been performed if the UE had waited one more second.

However, as in this case the goal is to provide IP access for the UE 1, and since the UE must have been allocated an IP address to be able to set up the IPsec, this implies that once the UE has been allocated an IP address, the UE can assume that if a procedure according to the EAP has not been executed before IP address allocation, e.g. via the DHCP, no procedure at all according to the EAP for achieving access authentication will be executed, compare step 1 above.

In the special case of using a procedure according to the (EAP) AKA, signalling could be done in the "AMF" (Authentication Management Field) field, not shown. This field is a native part of the AKA and is carried in the EAP Request AKA Challenge message, see FIG. 2, message No. 1, completely transparent to the EAP layer.

If the property "trust" is to be jointly decided by the home network, i.e. the home network (e.g. AAA server), and the access network 3, 3' used, the method and system as described herein could be used in conjunction with the process disclosed in the International patent application PCT/SE2008/050063, which hereby is incorporated by reference in its entirety. In said International patent application it is disclosed how each of a home network and an access network communicates a "security policy" within authentication signalling to the UE. The UE 1 can combine the two policies into a "least common denominator policy". A difference here is that it is assumed in the cited International patent application that it is already known which protocols to use, but not which policies that apply to them.

It should be understood that although the embodiment described above comprises e.g. an AAA server 13 in the home network in the form of a core network connected "behind" an access network 3, 3', as seen from the UE 1, any node adapted accordingly to send EAP Requests in a similar way as in the embodiments described above could be instead connected in the access network. e.g. an authentication server 14 connected in the VPLMN 7 of FIG. 1*b*.

In addition to or instead of whether properties indicating if an access network 3, 3' is trusted or not, other properties may be signalled from a server such as 13, 14 to the terminal or UE 1, e.g. which protocols to use, bandwidth, cost and services, in order to decide which access/way of communications/signalling that shall be selected by the terminal.

The signalling could, as an alternative to additional information elements in an EAP request, be done "piggybacked" in existing EAP AKA information elements. For instance, the home AAA server 13 could send to the UE EAP pseudonyms having their most significant bit set to "1" for trusted access and "0" for non-trusted access, etc.

Although the embodiments described above use the EAP, other embodiments of the method and system as described herein may use some non-EAP protocol in a procedure for setting up a connection, in particular in an initial or first stage of such a procedure, such as in an authentication procedure, e.g. the PPP (Point-to-Point Protocol), the PAP (Password Authentication Protocol), the CHAP (Challenge Handshake Authentication Protocol) and the SPAP (Shiva Password Authentication Protocol).

The invention claimed is:

1. A method of establishing connectivity from a user equipment to an external network through an access network, comprising:
   sending, to the access network from the user equipment, a request for a connectivity to the external network when the UE is not currently connected to the external network;
   a node in the access network receiving the request and, in response thereto, initiating an authentication procedure for the user equipment by sending a message to an Authentication, Authorization, Accounting (AAA) server in a home network of the user equipment, the AAA server executing the authentication procedure; and
   establishing the requested connectivity through the access network;
   wherein a first message sent to the user equipment from the AAA server in the authentication procedure includes information indicative of whether the AAA server considers the access network to be trusted; and
   wherein the user equipment, when establishing the requested connectivity, selectively sets up an Internet Protocol Security (IPSec) tunnel to a gateway in the home network based on the first message such that the user equipment;
      does not set up an IPSec tunnel to the gateway if the first message indicates that the AAA server considers the access network to be trusted; and
      does set up an IPSec tunnel to the gateway if the first message indicates that the AAA server considers the access network to be untrusted.

2. The method of claim 1, wherein the first message or another message sent to the user equipment from the AAA server indicates the use of at least one protocol to be used for communication along the requested connectivity to be established.

3. The method of claim 2, wherein said at least one protocol relates to security.

4. The method of claim 2, wherein said at least one protocol relates to mobility signaling.

5. The method of claim 1, wherein the authentication procedure is based on the Extensible Authentication Protocol (EAP) and the first message is an EAP message sent from the AAA server.

6. The method of claim 1, wherein the authentication procedure is based on the Extensible Authentication Protocol (EAP) Authentication and Key Agreement (AKA).

7. The method of claim 6, wherein the first message is an EAP Request/AKA challenge signal.

8. The method of claim 6, wherein the first message is an EAP Request/AKA-Notification signal.

9. The method of claim 6, wherein the first message is an EAP Success signal.

10. A user equipment for communication to an external network through an access network, said user equipment comprising:
    one or more processing circuits configured to:
       interpret a special condition indicated in a first message sent to the user equipment from an Authentication, Authorization, Accounting (AAA) server in a home network of the user equipment in an authentication procedure being part of setting up a connection from the user equipment to the external network through the access network when the user equipment is not currently connected to the external network, the special condition being indicative of whether the AAA server considers the access network to be trusted; and elating to at least one network property of the access network; and
    subsequently establish a connection to the external network that selectively includes an Internet Protocol Security (IPSec) tunnel to a gateway in the home network based on the special condition such that:
       the connection to the external network omits the IPSec tunnel if the special condition indicates that the AAA server considers the access network to be trusted; and
       the connection to the external network includes the IPSec tunnel if the special condition indicates that the AAA server considers the access network to be untrusted.

11. The user equipment of claim 10, wherein the one or more processing circuits are configured to:
    obtain information, from the first message or an additional message from the AAA server, indicating at least one protocol to be used for communication along the connectivity to be established; and
    use said at least one protocol in establishing the connectivity through the access network.

12. An Authentication, Authorization, Accounting (AAA) server in a home network of a user equipment, the AAA server configured to:
    send information to the user equipment in an authentication procedure being part of establishing connectivity from the user equipment to an external network through an access network;
    wherein the AAA server is configured to introduce, in a message included in said information sent to the user equipment, special information indicating a special condition indicative of whether the AAA server considers the access network to be trusted, or to modify said message to indicate the special condition, to control whether the user equipment, when not already connected to the external network, sets up an Internet Protocol Security (IPSec) tunnel to a gateway in the home network to establish a connection to the external network through the access network.

13. The server of claim 12, wherein the special information is also indicative of at least one protocol to be used for communication along the connectivity to be established.

14. The server of claim 12, wherein the AAA server is configured to introduce the special information in an Extensible Authentication Protocol (EAP) message.

15. The server of claim 14, wherein the EAP message is an EAP Request/AKA (Authentication and Key Agreement) challenge signal.

16. The server of claim 14, wherein the EAP message is an EAP Request/AKA (Authentication and Key Agreement) Notification signal.

17. The server of claim 14, wherein the EAP message is an EAP Success signal.

18. A computer program product for use by a user equipment related to an Authentication, Authorization, Accounting (AAA) server in a home network of the user equipment, the computer product being stored in non-transitory electronic memory carrying computer readable instructions which when run by the user equipment causes the user equipment to:

interpret a special condition indicated in one of the messages sent to the user equipment from the AAA server in an authentication procedure being part of setting up a connection from the user equipment to an external network through an access network when the user equipment is not already connected to the external network, the special condition being indicative of whether the AAA server considers the access network to be trusted; and subsequently establish a connection to the external network that selectively includes an Internet Protocol Security (IPSec) tunnel to a gateway in the home network based on the special condition such that the connection to the external network:

omits the IPSec tunnel if the special condition indicates that the AAA server considers the access network to be trusted; and includes the IPSec tunnel if the special condition indicates that the AAA server considers the access network to be untrusted.

19. A computer program product, for use by an Authentication, Authorization, Accounting (AAA) server in a home network of a user equipment, the computer program product being stored in non-transitory electronic memory carrying computer readable instructions which when run by the AAA server causes the AAA server to:

introduce, in a message included in information sent to the user equipment, special information indicative of whether the AAA server considers an access network through which a connection to the user equipment is to be set up to be trusted, to control whether the user equipment, when not already connected to an external network, sets up an Internet Protocol Security (IPSec) tunnel to a gateway in the home network to establish a connection to the external network through the access network; or modify said message to indicate the special condition.

* * * * *

UNITED STATES PATENT AND TRADEMARK OFFICE
CERTIFICATE OF CORRECTION

PATENT NO. : 8,621,570 B2
APPLICATION NO. : 12/937008
DATED : December 31, 2013
INVENTOR(S) : Näslund et al.

It is certified that error appears in the above-identified patent and that said Letters Patent is hereby corrected as shown below:

On the Title Page

Item (12), under "United States Patent", in Column 1, Line 1, delete "Naslund" and insert
-- Näslund --, therefor.

Item (75), under "Inventors", in Column 1, Line 1, delete "Mats Naslund," and insert
-- Mats Näslund, --, therefor.

Item (75), under "Inventors", in Column 1, Line 2, delete "FL (US);" and insert -- (FI); --, therefor.

Item (75), under "Inventors", in Column 1, Line 3, delete "Jarfalla" and insert -- Järfälla --, therefor.

Item (75), under "Inventors", in Column 1, Line 4, delete "FL (US);" and insert -- (FI); --, therefor.

Item (75), under "Inventors", in Column 1, Lines 5-6, delete "Vastra Frolunda" and insert
-- Västra Frölunda --, therefor.

Item (57), under "ABSTRACT", in Column 2, Line 3, delete "indication or" and insert -- indication
of --, therefor.

Item (57), under "ABSTRACT", in Column 2, Line 6, delete "sue and" and insert -- second --,
therefor.

In the Specification

In Column 1, Line 39, delete "entrusted" and insert -- untrusted --, therefor.

In Column 2, Line 10, delete "access." and insert -- access, --, therefor.

Signed and Sealed this
Eighteenth Day of November, 2014

Michelle K. Lee
*Deputy Director of the United States Patent and Trademark Office*

In Column 2, Line 51, delete "operators." and insert -- operators, --, therefor.

In Column 3, Line 36, delete "network." and insert -- network, --, therefor.

In Column 4, Line 24, delete "Network)." and insert -- Network), --, therefor.

In Column 4, Lines 41-42, delete "procedure." and insert -- procedure, --, therefor.

In Column 5, Line 17, delete "identity" and insert -- Identity --, therefor.

In Column 7, Line 53, delete "multihorning," and insert -- multihoming, --, therefor.

In Column 8, Line 50, delete "seen," and insert -- seen --, therefor.

In Column 11, Line 7, delete "network." and insert -- network, --, therefor.

In the Claims

In Column 11, Line 54, in Claim 1, delete "equipment;" and insert -- equipment: --, therefor.

In Column 12, Line 31, in Claim 10, delete "elating" and insert -- relating --, therefor.